United States Patent
Cavazzoni et al.

(10) Patent No.: US 7,925,165 B2
(45) Date of Patent: Apr. 12, 2011

(54) PACKET AND OPTICAL ROUTING EQUIPMENT AND METHOD

(75) Inventors: Carlo Cavazzoni, Turin (IT); Alessandro D'Alessandro, Turin (IT)

(73) Assignees: Telecom Italia S.p.A., Milan (IT); Pirelli & C. S.p.A., Milan (IT)

( * ) Notice: Subject to any disclaimer, the term of this patent is extended or adjusted under 35 U.S.C. 154(b) by 956 days.

(21) Appl. No.: 10/567,370

(22) PCT Filed: Aug. 7, 2003

(86) PCT No.: PCT/EP03/08727
§ 371 (c)(1),
(2), (4) Date: Feb. 7, 2006

(87) PCT Pub. No.: WO2005/015944
PCT Pub. Date: Feb. 17, 2005

(65) Prior Publication Data
US 2006/0257143 A1    Nov. 16, 2006

(51) Int. Cl.
*H04J 14/02* (2006.01)
*H04J 14/00* (2006.01)

(52) U.S. Cl. ............. 398/83; 398/49; 398/57; 398/59; 398/60

(58) Field of Classification Search .......... 370/352, 370/353; 398/79, 83, 59, 60, 45–57
See application file for complete search history.

(56) References Cited

U.S. PATENT DOCUMENTS

| | | | |
|---|---|---|---|
| 5,920,412 A | 7/1999 | Chang | |
| 6,256,125 B1 * | 7/2001 | Uehara | 398/79 |
| 6,288,811 B1 * | 9/2001 | Jiang et al. | 398/79 |
| 6,411,412 B1 * | 6/2002 | Jiang et al. | 398/59 |
| 7,263,091 B1 * | 8/2007 | Woo et al. | 370/351 |
| 2002/0018269 A1 | 2/2002 | Chaudhuri et al. | |
| 2002/0024698 A1 | 2/2002 | Jiang et al. | |
| 2002/0176131 A1 * | 11/2002 | Walters et al. | 359/118 |

FOREIGN PATENT DOCUMENTS

| | | |
|---|---|---|
| EP | 0 818 940 A2 | 1/1998 |
| EP | 1 076 468 A2 | 2/2001 |
| EP | 1 091 529 A2 | 4/2001 |

* cited by examiner

*Primary Examiner* — Ken N Vanderpuye
*Assistant Examiner* — Daniel G Dobson
(74) *Attorney, Agent, or Firm* — Finnegan, Henderson, Farabow, Garrett & Dunner, L.L.P.

(57) ABSTRACT

A packet and optical routing equipment exchanges multiplexed optical signals with other equipment in a network and exchanges branch non-packet and packet signals with client equipment. The entering branch non-packet signals are converted into electric signals by a non-packet interface and supplied directly to an electric switching unit, the entering packet branch signals are converted into electric signals, supplied to a packet forwarding module and routed to the electric switching unit. The electric switching unit switches the electric signals toward a WDM interface that converts them into optical signals at selected wavelengths that are added to the multiplexed optical signals. The entering multiplexed optical signals that should be terminated in the equipment are extracted, converted into electrical signals, and electrically switched toward the non-packet interface or the packet forwarding module according to whether they are of non-packet or of a packet type. The switching unit is of configurable type and may switch a variable ratio of electric non-packet and packet signals according to the traffic requirements.

19 Claims, 5 Drawing Sheets

PACKET AND OPTICAL ROUTING EQUIPMENT AND METHOD

CROSS REFERENCE TO RELATED APPLICATION

This application is a national phase application based on PCT/EP2003/008727, filed Aug. 7, 2003, the content of which is incorporated herein by reference.

TECHNICAL FIELD

The present invention relates in general to the field of optical communication systems and more in particular to a packet and optical routing equipment and method.

PRIOR ART

As is known, the growth of the Internet has brought to ever-increasing traffic volumes that in turn require the use of broader-band communication systems. Thus, the use of optical communication systems, employing fiber optics, has already been proposed for transmitting IP packets. The resulting increasing and progressive integration of data and voice traffic brings about the need of systems and equipment adapted to manage transmission of both traditional optical signals (e.g. SONET/SDH, Synchronous Optical Network/Synchronous Digital Hierarchy or ATM, Asynchronous Transfer Mode signals) and packet-based signals (e.g. IP/MPLS, Internet Protocol/Multi-Protocol Label Switching signals).

Currently, IP/MPLS routers and non-IP equipment are attached to networks using WDM (Wavelength Division Multiplexing) systems through optical interfaces and the control of the different systems is not integrated. This leads to complex and expensive network configurations that do not facilitate the introduction of new services in communication network.

To solve this problem, integration of packet and optical forwarding capabilities in a same node of the network is desired.

US 2002/0018269 discloses a method and system for controlling optical connections in an optical network, wherein every node in the network consists of a router and an optical cross-connect and intelligence for resource management is concentrated in the IP layer. This document however does not disclose in detail the architecture of the nodes of the network and in particular how IP and non-IP signals are multiplexed in the nodes.

EP-A-1 076 468 teaches the architecture of IP packet transmission equipment connected by optical backbone transmission lines to form an IP packet transmission network. According to this document, each arbitrary signal is converted into IP packets that are routed by an IP routing part to optical path conversion parts. Optical path signals from the optical path signal conversion parts are provided directly to an optical path route switching part of the IP packet transmission equipment. The optical path route switching part also receives optical path signals obtained by wavelength demultiplexing and optical/electric/optical converting OTM (Optical Transport Module) signals from optical backbone transmission lines. The optical path route switching part cross-connects the optical path signals to output routes according to their destinations.

Applicant remarks that this architecture is complex and involves a substantial processing of both the OTM signals from the optical backbone transmission lines and the arbitrary signals that are directly inputted in the IP packet transmission equipment.

DISCLOSURE OF THE INVENTION

The aim of the invention is thus to provide a packet and optical routing equipment and method that are simple and offer savings in the expenditure as regards implementation and operation.

Applicant has developed a simple architecture in which both packet and non-packet signals are forwarded and routed in the same node, with an integrated control of the different parts managing the packet and non-packet signals. The presence of non-packet interfaces, not requiring packet elaboration, as well as packet interfaces, both connected to a WDM interface unit by a switching unit, allows a smooth evolution from a network based on traditional TDM (Time Division Multiplexing) circuits to a network based on more modern IP/MPLS and/or GMPLS (Generalized Multi-Protocol Label Switching) services.

In particular, the reconfigurability of the electric switching unit allows a variable proportion of input/outputs for packet and non packet signals to be connected each time to the WDM interface unit. The ratio of connected non-packet input/outputs to connected packet input/outputs is thus variable according to the need, offering a great deal of flexibility and cost saving due to the fact that in general is possible to reduce the number of lasers equipped in the WDM interfaces.

According to the present invention, there is provided a packet and optical routing equipment, comprising:
  optical input means receiving input multiplexed signals;
  optical output means supplying output multiplexed signals;
  a non-packet optical port exchanging branch non-packet signals;
  a packet optical port exchanging branch packet signals;
  an optical forwarding and multiplexing stage coupled between said optical input and said optical output;
  a packet forwarding stage connected between said optical packet port and said optical forwarding and multiplexing stage;
characterized by:
  a non-packet optical/electric converter connected to said non-packet optical port and converting said branch non-packet signals into and from non-packet electric signals;
  a packet optical/electric converter connected between said optical packet port and said packet forwarding stage, said packet optical/electric converter converting said branch packet signals into and from electric packet signals exchanged with said packet forwarding stage;
  an electric switching unit connected to said non-packet optical/electric converter and said packet forwarding stage for exchanging therewith said electric non-packet and packet signals; and
  an interface converter coupled between said electric switching unit and said optical forwarding and multiplexing stage for converting said electric non-packet and packet signals into and from optical signals supplied to and from said optical forwarding and multiplexing stage.

According to the invention, an optical network of wavelength multiplexing type and a method for packet and non-packet optical signal routing are provided, according to claims 13, and 14, respectively.

BRIEF DESCRIPTION OF THE DRAWINGS

For an understanding of the present invention preferred embodiments thereof are now described, purely by way of non-limiting example, with reference to the attached drawings, wherein.

In the following description, the expression "non-packet interface" indicates any type of interface that processes signals that do not require processing at a packet level, independently from the presence or not of packet or non-packet traffic within the signals (e.g. SDH, ATM, Gigabit Ethernet, Fibre Channel); conversely, the expression "packet interface" indicates any type of interface that processes signals at a packet level. Correspondingly, the expression "non-packet signals" indicates any type of signals that are output or directed toward a non-packet interface, independently from the presence or not of packet or non-packet traffic within the signals (e.g. SDH, ATM, Gigabit Ethernet, Fibre Channel).

BEST MODE OF IMPLEMENTING THE INVENTION

Figure 1:
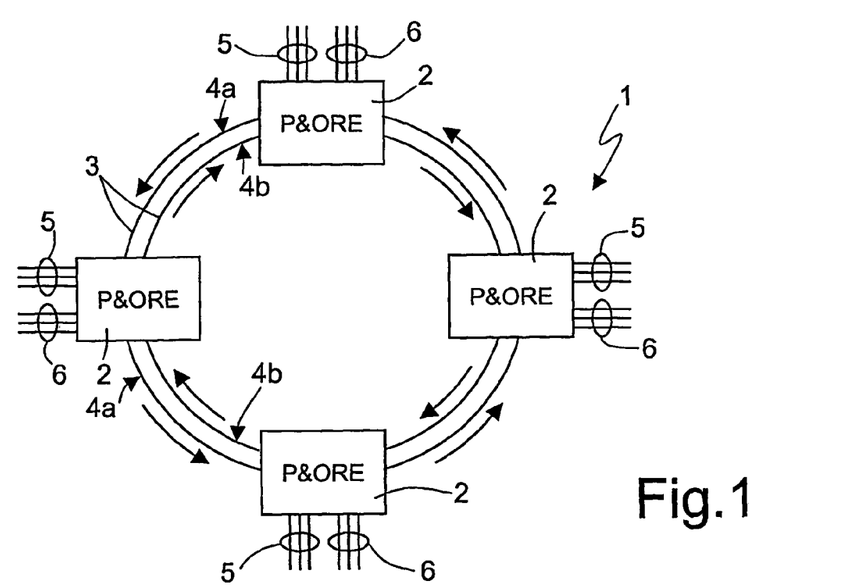
FIG. 1 illustrates a wavelength division multiplexed optical network of the ring-type, according to an embodiment of the invention.

FIG. 1 illustrates an optical network 1 implementing a wavelength division multiplexing (WDM) technique and having a ring-like configuration. The ring-like configuration is only an example, and the invention is applicable to also meshed-type networks, as will be clear later on.

According to FIG. 1, the optical network 1 comprises a number of nodes 2, here four, each defining a packet and optical routing equipment (P&ORE). Each node 2 is connected to a neighboring node 2 through optical fibers 3, each optical fiber 3 being able to carry a certain number (e.g. 40) of optical wavelengths $\lambda 1, \lambda 2, \ldots, \lambda N$. The optical fibers 3 form an external ring 4a and an internal ring 4b. For example, the external ring 4a is designed to carry signals in a counter-clockwise direction and the internal ring 4b is designed to carry signals in a clockwise direction.

Each node 2 is connected to a first and a second group of interfaces 5, 6. The first group of interfaces 5 connects the node 2 to non-packet clients (e.g. SDH equipment); the second group of interfaces 6 connects the node 2 to packet clients (e.g. edge routers).

Figure 2:
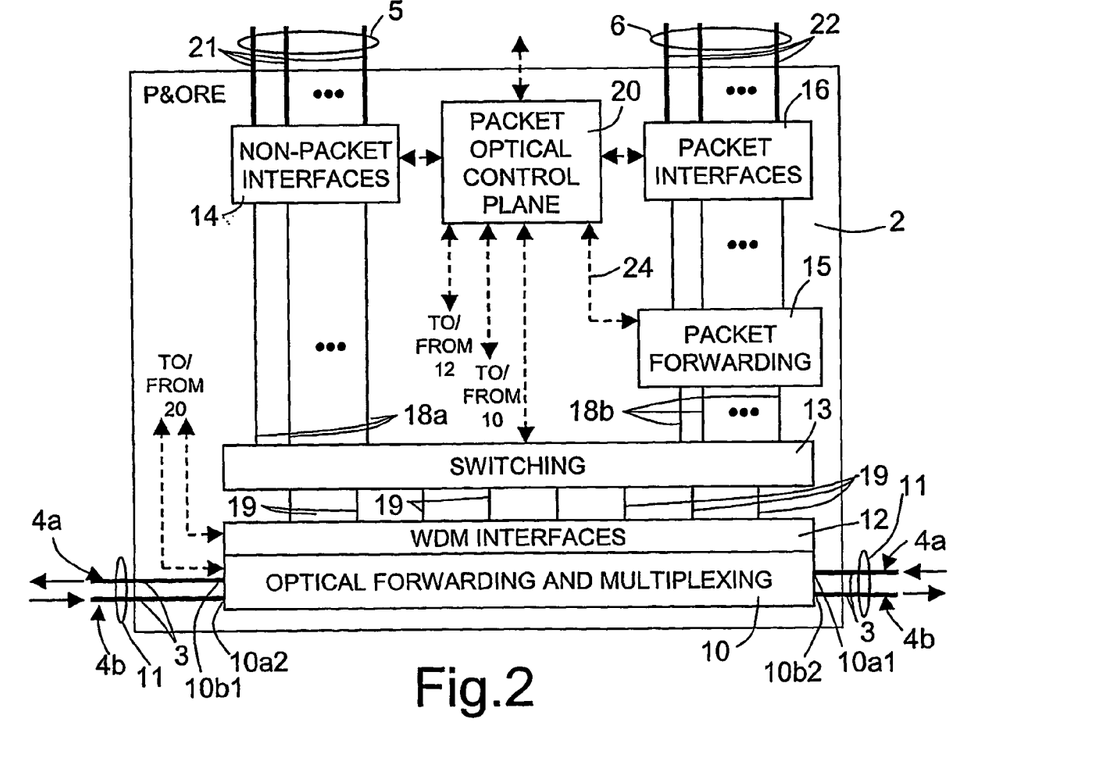
FIG. 2 is a block diagram of one of the nodes of the network of FIG. 1.

FIG. 2 shows a simplified block diagram of a node 2. The node 2 comprises an optical forwarding and multiplexing unit 10 having two input ends 10a1, 10a2 and two output ends 10b1, 10b2 connected to the optical fibers 3 through fiber interfaces 11, shown only schematically. The optical forwarding and multiplexing unit 10 has the task of adding/dropping to/from an exiting/entering multiplexed signal the optical signals that are to be inserted/extracted in the node; furthermore, it has the task of transferring the optical signals coming from an entering optical fiber 3 and to be transferred to a next node 2 toward an exiting optical fiber 3.

The optical forwarding and multiplexing unit 10 is associated, as more clearly described later on, to a WDM interface unit 12 converting the optical signals extracted in the node 2 into electrical signals and converting the electrical signals to be inserted on the optical fibers 3 into optical signals of suitable wavelength.

The WDM interface unit 12 is connected to an electric switching unit 13 switching electrical signals between the WDM interface unit 12, on one side, and a non-packet interface 14 and a packet forwarding module 15, on the other side. To this end, the electric switching unit 13 has non-packet input/outputs 18a connected to the non-packet interface 14, packet input/outputs 18b connected to the packet forwarding module 15 and switch input/outputs 19 connected to the WDM interface unit 12.

The non-packet interface 14 has the main task of converting the electrical signals coming from the electric switching unit 13 (also called branch non-packet signals) into optical signals supplied to the first group of interfaces 5 through non-packet ports 21, and vice versa. Furthermore, the non-packet interface 14 has the task, if necessary, of performing specific signal processing, such as Client Overhead processing.

The packet forwarding module 15 has the task of managing packet-like signals and may be the forwarding plane of commercially available packet routers (e.g. IP/MPLS routers—Internet Protocol/Multi-Protocol Label Switching routers). The packet forwarding module 15 thus interconnects the electric switching unit 13 to packet interfaces 16 that have the main task of converting the electrical signals coming from the packet forwarding module 15 (also called branch packet signals) into optical signals supplied to the second group of interfaces 6 through packet ports 22, and vice versa. Furthermore, the packet interfaces 16 have the task of performing specific signal processing, as known for any standard packet interface. The packet forwarding module 15 has also the task of forwarding control signals to/from a packet and optical control plane 20 through a connection line 24 in particular operative conditions and in case of particular setting of the network, as explained hereinbelow.

The packet and optical control plane 20 is connected to all the components of the node 2 and controls the operation thereof, as explained in more detail later on; the packet and optical control plane 20 is also connected to outside equipment with which it exchanges information/controls. The packet and optical control plane 20 can be a software enhancement of a commercially available packet control plane with the capacity of monitoring signaling coming from the optical fibers 3 and/or from Management Systems and/or from legacy equipment (e.g. by Optical User-to-network interface O-UNI that has been defined in OIF-Optical Internetworking Forum), to send commands to the components of the node 2, as indicated, and to drive packet routing of the packet forwarding module 15. The packet and optical control plane 20 and the packet forwarding module 15 form, together, a packet forwarding stage, suitable for processing packet signals.

In the node 2 of FIG. 2, optical packet and non-packet signals supplied by the first and second group of interfaces 5, 6 are converted into electrical signals and processed in the non-packet and packet interfaces 14, 16, (and in the packet forwarding unit 15 in the case of packet signals), then they are supplied to the WDM interfaces 12 through the switching unit 13. The WDM interfaces 12 convert the electric signals into optical signals of suitable wavelength and supply them to the optical forwarding and multiplexing unit 10. The optical forwarding and multiplexing unit 10 inserts the converted optical signals into the outgoing fibers 3. Conversely, optical signals of preselected wavelengths, to be terminated at the node 2, are extracted by the optical forwarding and multiplexing unit 10, converted into electric signals and in case processed by WDM interfaces 12. These signals are then switched to the non-packet interface 14 and supplied to the first group of interfaces 5 in the case of non-packet signals or to the packet forwarding module 15 in the case of packet signals. Packet signals are then supplied to second group of interfaces 6 or towards WDM interfaces 12 in case of packets directed to other nodes 2, according to their destination.

Thereby, with a simple architecture, both packet and non-packet signals are forwarded and routed in the same node, with an integrated control of the different parts managing the packet and non-packet signals. Thus, a cost reduction is achieved, due to the reduction of expensive Optical/electric/optical interfaces between the router and the optical forwarding and multiplexing unit 10. This advantage is enhanced by the additional presence of parts (non-packet interfaces 14) not requiring packet elaboration, connected to the optical forwarding and multiplexing unit 10 by only the switching unit 13. This approach allows a smooth evolution from a network based on traditional TDM (Time Division Multiplexing) circuits to a network based on more modern IP/MPLS and/or GMPLS (Generalized Multi-Protocol Label Switching) services.

According to an aspect of the invention, the electric switching unit 13 is of a reconfigurable type, and allows a variable proportion of input/outputs 18a and 18b to be connected each time to the switching input/outputs 19, according to the needs. To this end, the electric switching unit 13 has m1 non-packet input/outputs 18a connected to the non-packet interface 14, m2 packet input/outputs 18b connected to the packet forwarding module 15 and n switching input/outputs 19 connected to the WDM interface unit 12, with m=m1+m2 being generally greater than or equal to n. Thus, generally not all the non-packet and packet input/outputs 18a, 18b may be simultaneously connected to the switching input/outputs 19, and typically no fixed connection exists between the non-packet and packet input/outputs 18a, 18b, on one side, and the switching input/outputs 19, on the other side. The packet and optical control plane 20 decides during operation the specific connections to be activated, according to the non-packet and packet signals to be exchanged between the non-packet interface 14 and the packet forwarding module 15, on one side, and the WDM interface unit 12, on the other side. The ratio of connected non-packet input/outputs 18a to connected packet input/outputs 18b is thus variable according to the need, offering a great deal of flexibility and cost saving due to the fact that in general is possible to reduce the number of lasers equipped in the WDM interfaces 12.

The reconfigurability of the electric switching unit 13 allows a simple implementation of protection procedures, allowing splitting of a signal received on either the non-packet or the packet input/outputs 18a, 18b into two equal signals which are assigned different wavelengths and/or transmitted onto both rings 4a, 4b to obtain a redundancy transmission. Furthermore, in case of an electric switching unit 13 configured so as to allow connection between two different switching input/outputs 19, it is also possible to route signals traveling onto one of the rings (e.g. the external ring 4a) toward the other ring (e.g. the internal ring 4b), for overcoming any failure on the network.

Figure 3:
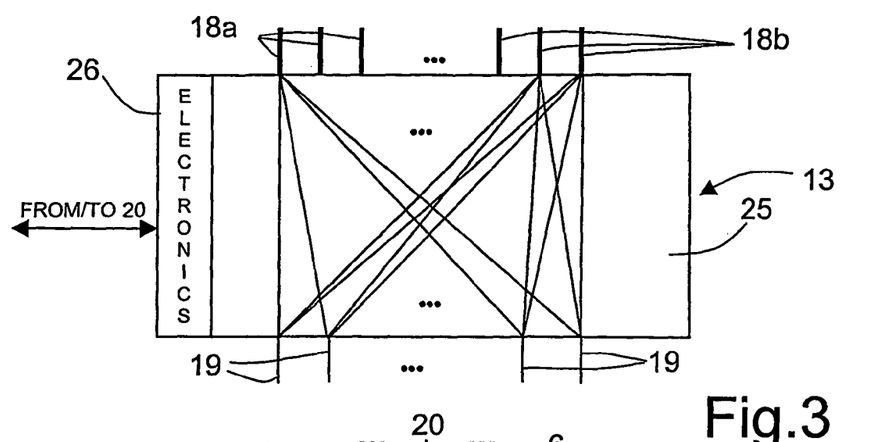
FIG. 3 is a more detailed block diagram of one component of the node of FIG. 2.

The electric switching unit 13 may be implemented as shown schematically in the block diagram of FIG. 3 by a crosspoint switch array 25 and a controlling electronics 26.

The controlling electronics 26 should generally include one or more processors for controlling the effective switching of the crosspoint switch array 25, as well as a circuitry, e.g. for operation and maintenance purposes.

The signals entering the crosspoint switch array 25, at high frequency (e.g. a few/tens of GHz) may be divided into parallel flows so as to reduce the frequency thereof, and switched at a lower frequency. Then, the split signals are grouped together again at the output, to obtain the original entering signal at high frequency.

The crosspoint switch array 25 may be a commercial component. For example, for a network operating under the specification G.709, with a frequency of 10.709 Gb/s, assuming 8+8 switching input/outputs 19 (ability of adding/dropping 8 channels for each ring 4a, 4b), taking into account that each channel is bidirectional, so that 16 channels are to be exchanged for each ring, and assuming that each channel is demultiplexed into e.g. four channel operating in parallel at a lower frequency, thus requiring in practice the switching of 128 channels, the crosspoint switch array 25 may be implemented by the component VSC 3140 of Vitesse Semiconductor Corporation (144×144 channels at 3.6 Gb/s).

Figure 4:
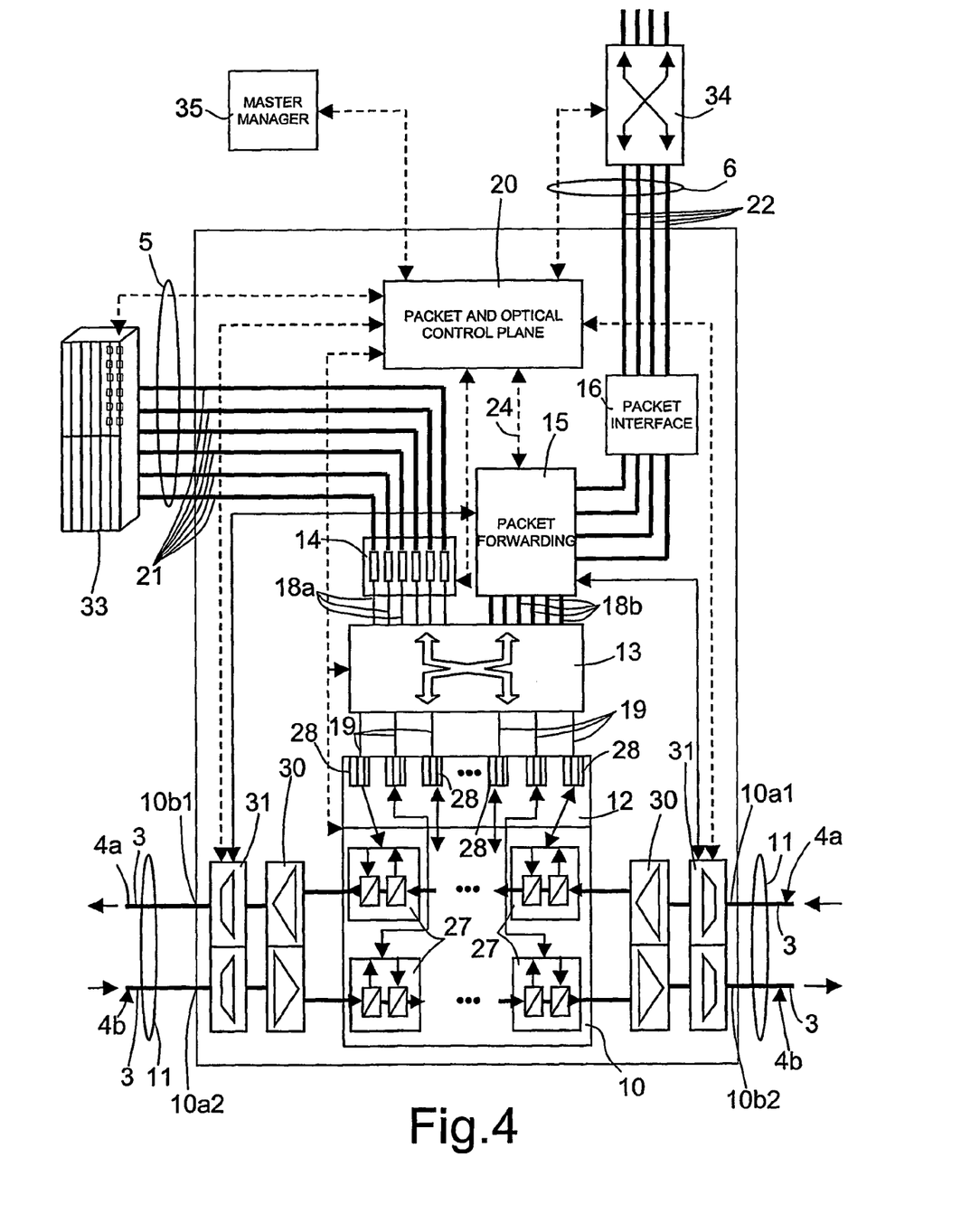
FIG. 4 is a more detailed block diagram of the node of FIG. 2.

FIG. 4 shows an embodiment of node 2, representing, in particular, the structure of the WDM interface unit 12 and the optical forwarding and multiplexing unit 10. FIG. 4 also shows the connections among the functional blocks. Such connections do not represent necessarily physical links but in general data and/or signaling logical flows and a different mix of fibers and electrical connections could be used. In general, thick lines represent optical connections, thin lines represent electrical connections for data exchange and dashed lines represent control connections between the packet and optical control plane 20 and the control logic units of each block.

Figure 8:
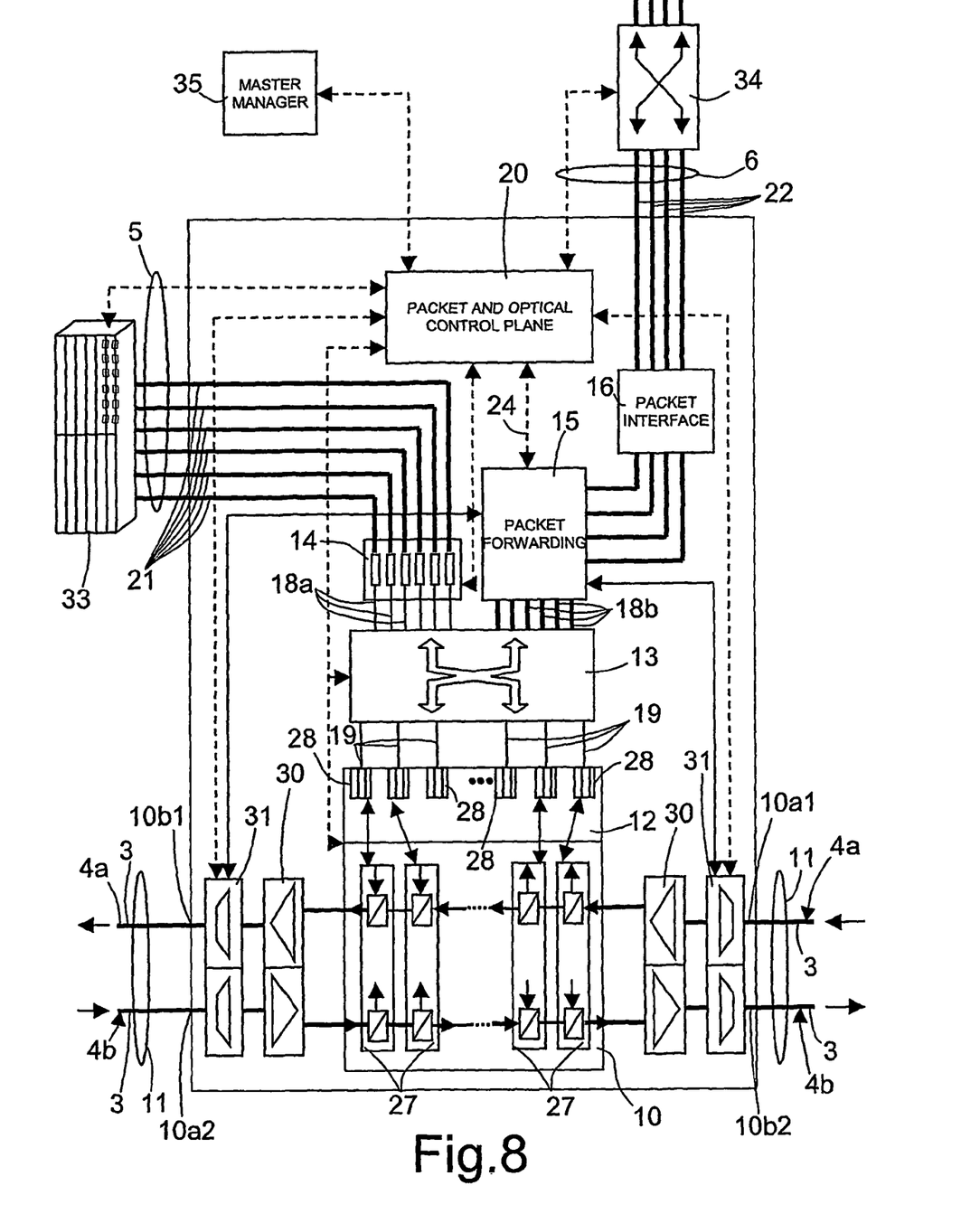
FIG. 8 is a more detailed block diagram of the node of FIG. 2, in an embodiment alternative to that of FIG. 4.

Specifically, the optical forwarding and multiplexing unit 10 comprises two groups of optical add/drop multiplexers (OADMs) 27. The groups of OADMs 27 can be either used to add/drop a wavelength from a single ring entering on one side of the node 2 and exiting from the other (ring 4a or 4b), as shown in FIG. 4, or to add/drop a wavelength from the two optical fibers 3 on the same multiplexed interface 11, as shown in FIG. 8. Each group comprises a plurality of OADMs 27 cascade-connected, to allow passage of the signals toward a next node 2 in the preset direction as well as extraction of the signals to be terminated in the node 2 and insertion of the signal to be added to the respective optical fiber 3. Preferably, the OADMs 27 are tunable, so as to allow selection of the wavelengths of the signals to be added/dropped, and have known structure (see e.g. the optical recirculators and associated optical channel selectors described in US 2002/0024698 A1; suitable OADMs may be also the commercial components "Lambda Flow" commercialized by Lambda Crossing; "CP-3204" commercialized by Clarendon Photonics; or "Fasma tunable filters" commercialized by Ondax).

In case of OADMs 27 connected on ring 4a or 4b, FIG. 4, each group of OADMs 27 is connected at the input and output ends 10a1, 10a2, 10b1, 10b2 to the respective ring 4a, 4b by control channel termination units 31, of known type. Optical amplifiers 30 may be included between control channel termination units 31 and OADMs 27, if needed for power budget purposes. In particular, the control channel termination units 31 are connected to the packet and optical control plane 20 and to the packet forwarding module 15 and operate to extract/insert the signals traveling on the control channel, before reaching the optical amplifiers 30 if present, as below explained.

The WDM interface unit 12 comprises two batteries of transceivers 28, one for each set of each OADM 27. Each transceiver 28 is connected to a respective OADM 27 and to a respective switch input/output 19 and is formed by three parts, in a per se known manner and shown only schematically in FIG. 4. In detail, each transceiver 28 comprises a transmitter, a receiver and a processing electronics. The transmitters are implemented by lasers that convert the electrical signal supplied on the respective switch input/output 19 into an optical signal to be added to the respective optical fiber by the associated OADMs 27. Preferably, the lasers are tunable and are operated at a wavelength set by the packet and optical control plane 20. Thus, they perform wavelength adaptation between the client signals and the optical ring network. The receivers are photodectors of gray type, and are able to receive the optical signals extracted by the respective OADMs 27 and convert them into electric signals. The processing electronics performs specific functions on the network wavelengths, such as overhead processing (e.g. channel identifying, performance monitoring, etc.).

Although in FIG. 4 the transceivers 28 are shown grouped in a stand-alone module (WDM interface unit 12), they may be integrated partially in the optical forwarding and multiplexing unit 10; e.g. only the transmitters, the receivers or the opto-electronic components (transmitters+receivers) may be integrated in the optical forwarding and multiplexing unit 10.

FIG. 4 also shows a client apparatus 33, connected to the first group of interfaces 5, a packet routing equipment 34 (e.g. an IP router), connected to the second group of interfaces 6 and a network master manager 35. The client apparatus 33 and the packet routing equipment 34 are connected to the packet and optical control plane 20, for exchanging control signals; the network master manager 35 may be connected to the packet and optical control plane 20 through intermediate layers, not shown.

With the architecture shown in FIGS. 1-4, a link between two generic nodes 2 may be established as an explicit request from a non-packet client 33, or a packet routing equipment 34; as an internal decision from the packet and optical control plane 20 due to some packet traffic needs or as a request from the master manager 35.

According to a possible implementation, the request is communicated to the node 2 through a direct communication between the client and the source node 2, using the direct line connecting the client apparatus 33 or the packet routing equipment 34 to the packet and optical control plane 20, by a standard protocol such as OIF (Optical Internetworking Forum) O-UNI (Optical User Network Interface) interface or by other protocols. In the alternative, an indirect communication between client and the node 2 is performed, by signaling involving the master manager 35.

When the packet and optical control plane 20 of a node 2 generates a request (coming from clients or internally generated) of setting up a connection (lightpath setup request), it chooses a certain wavelength ($\lambda x$) on either the external or internal ring 4a, 4b and signals the request to a destination node 2, e.g. by GMPLS signaling. The request is sent onto a control channel that, in the shown embodiment, is implemented as an in-fiber/out-of-band mode, that is it uses, on the optical fibers 3, a specific wavelength, not comprised in the common band of the data signals (e.g. at 1510 nm, outside the known C and L band of optical amplifiers for the data signals).

In the alternative, by providing specific interfaces to the node 2 or exploiting already existing traffic interface towards packet (e.g. IP) equipment, it is possible to implement an out-of-fiber control channel, e.g. by a separate packet (such as IP) network.

According to a different embodiment, the control channel may be implemented in an in-fiber/in-band mode, at a preset wavelength, in which case the control signals are extracted and added on the internal or external ring 4a, 4b by an own OADM 27 and an own transceiver 28, that operate at a fixed wavelength, selected for control signaling. In this case, the control signals extracted by the associated OADM 27 and converted by the associated transceiver 28 are routed by the electric switching unit 13 to the packet forwarding module 15 and then (through connection line 24) to the packet and optical control plane 20, where they are processed. Analogously, control signals to be sent to a subsequent node 2 are transmitted by the packet and optical control plane 20 to the associated transceiver 28 through the connection line 24, the packet forwarding module 15 and the switching unit 13, converted into optical signals and added to the other optical signals on the selected ring 4a, 4b by the associated OADM 27.

The lightpath setup request is extracted either by the channel termination unit 31 (in case of in-fiber/out-of-band mode) or by the associated OADM 27 (in case of in-fiber/in-band mode) of a subsequent node 2 on the selected ring 4a, 4b and sent to the relative packet and optical control plane 20 that processes the request, verifies internally the availability of resources (e.g. a certain wavelength) and performs any other necessary elaboration (e.g. policy, priorities). If the request is accepted, the packet and optical control plane 20 books the required resources and propagates the request to the next node 2 on the selected ring 4a, 4b; otherwise, the request is refused, sending a refuse message to the source node 2. At the destination node 2, the packet and optical control plane 20 verifies the availability of a transceiver 28 and relative OADM 27, as well as all other requirements, as above described. Moreover, the packet and optical control plane 20 must verify the availability of resources towards the client and in general it should agree on the way to perform the connectivity with the client.

If all checks are passed, the request is accepted, resources are allocated and a positive response is sent towards the source node 2 by the destination node 2. Depending on the implementation, for a bidirectional connection, the backward path may be established either on the same part of ring 4a, 4b on the optical fibers 3 not used previously, or on the complementary part of ring 4a, 4b. In the latter case, a new signaling procedure, as described above, has to be activated; the wavelength required and any other requirement (e.g. priority), may be different from the one used from the source node 2.

In case of an out-of-fiber/out-of-band mode, the same procedure as above described applies, except for the control signals travelling on a separate network, e.g. an IP network.

The connection is thus set up by properly setting the electric switching unit 13 and tuning the tunable laser of the transceivers 28 of both the source and destination nodes 2, if applicable, and by tuning the OADMs 27 of the source and the destination nodes 2, if applicable.

Therefore, as above explained, the source node 2 may send non-packet and packet data on the reserved channel (specified wavelength on the selected external or internal ring 4a, 4b), through the lasers of transceivers 28 and through OADMs 27, either or both being suitably tuned if applicable. Data signals exiting the source/destination node 2 thus pass the intermediate nodes 2, without being processed therein, until the destination/source node 2, where they are extracted by the OADMs 27 and converted by the transceivers 28, either or both being suitably tuned if applicable. According to the signal nature, data signals are then switched by the electric switching unit 13 of the destination node 2 (and source node 2 for the contradirectional flow coming from destination node) and passed to the non-packet interface 14 or to the packet forwarding module 15, wherefrom they are transmitted to the client apparatus 33 or to the packet routing equipment 34.

Figure 5:
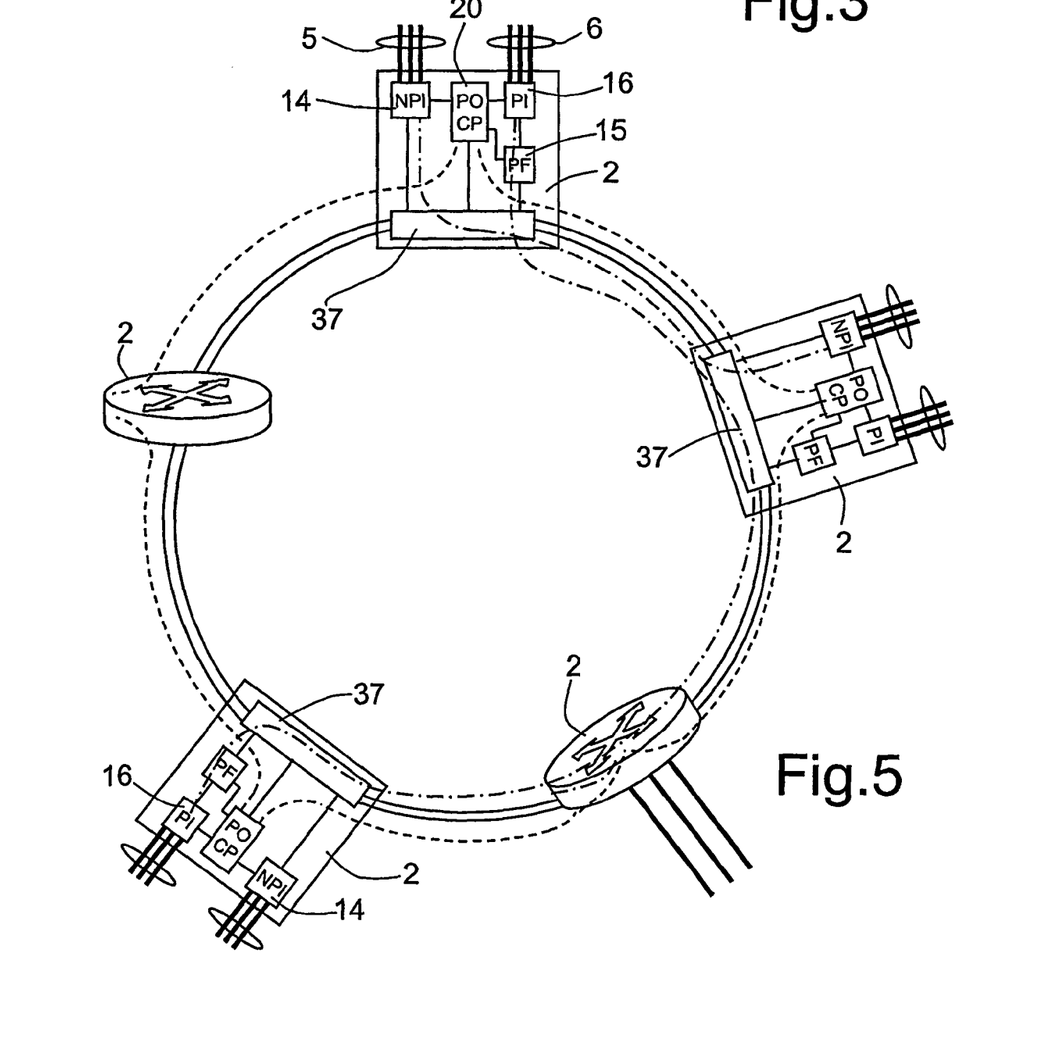
FIG. 5 represents the flow of control and a data signals on the network of FIG. 1.

The above operation of the network is schematically shown in FIG. 5, wherein only three nodes are shown more in detail and only with regard to the specific blocks necessary to show the different processing of control signals (the transmission whereof is represented by dashed lines passing through and processed, if necessary, at the packet and optical control plane—POCP—20 of all nodes), and data (packet and non-packet) signals (whose optical path is represented by dash-and-dot lines passing through all nodes along the path but processed at only the source and destination nodes 2). Here, the optical forwarding and multiplexing unit 10, the WDM interface unit 12 and the electric switching unit 13 have been shown as a single block 37 (forwarding and switching).

According to a peculiarity of the present network, the connectivity of data packet signals can be implemented in a flexible way. Thereby, if data packet traffic is below a certain threshold, a base connectivity is established, using the control channel also for packet communication. That approach allows a wavelength to be saved as long as traffic is below a certain threshold. In this case, data packet signals are processed at all nodes 2, including the intermediate nodes 2, where packets reach the respective packet forwarding modules 15 and are routed by those ones to the appropriate next node 2. When the traffic becomes higher and goes above the threshold, data packets are routed on an optical path on purpose established as above described with reference to FIGS. 1-4, with direct connection between the source and destination nodes 2 and no processing at the intermediate nodes 2. If, thereafter, traffic reduces below the threshold (or a different threshold) on the established optical path, the base connectivity is used again for transmitting data packet signals as above explained.

According to one solution, in case of low volume traffic, base connectivity of packet (e.g., IP) data traffic is implemented using the optical path previously established for control signals, as above described; in an alternative, base connectivity is implemented using a specific wavelength among those used for transmitting data.

Figure 6:
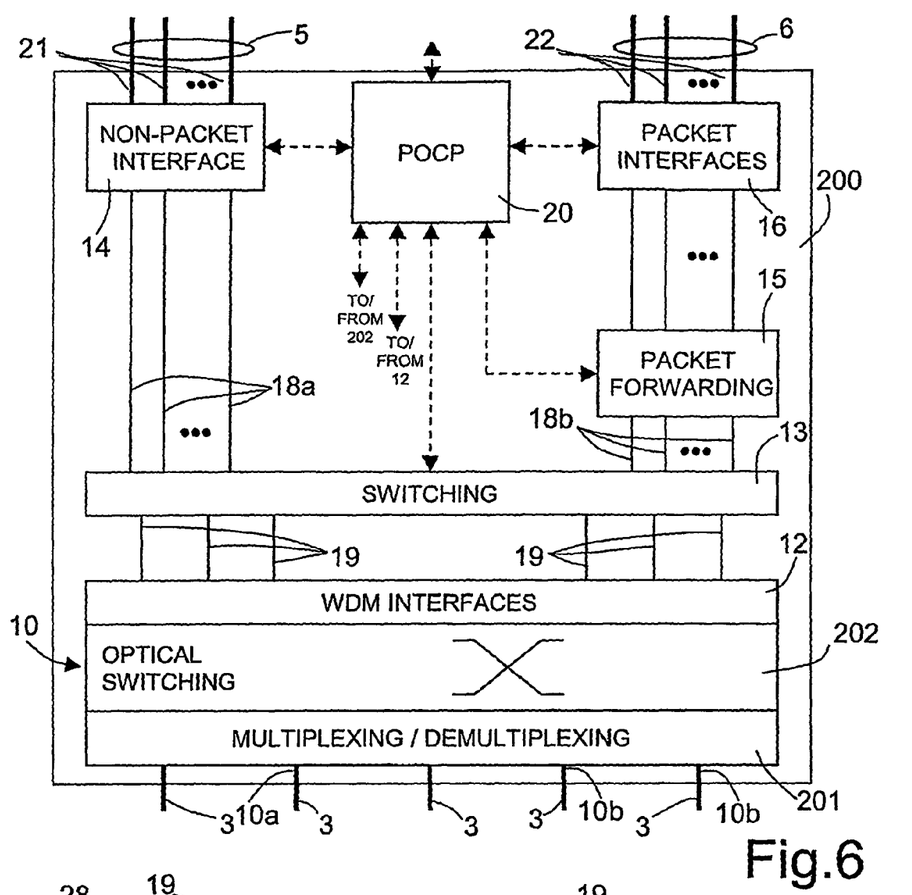
FIG. 6 is a block diagram of a node of wavelength division multiplexed optical network of a meshed type.

FIG. 6 shows the simplified block diagram of a node 200 suitable for an optical network implementing a wavelength division multiplexing (WDM) technique and having a meshed-like configuration. The basic structure of the node 200 is the same as that of the node 2 shown in FIG. 2, and thus similar parts have been identified by the same reference numerals and will not be described again. The node 200 of FIG. 6 differs from the node 2 of FIGS. 2, 4 basically for the optical forwarding and multiplexing part, as below discussed.

According to FIG. 6, the optical forwarding and multiplexing unit 10 comprises a multiplexing/demultiplexing unit 201 having inputs 10a and outputs 10b connected to a plurality of optical fibers 3 connected to the other nodes of the network and carrying optical signals to and from the node 200. The multiplexing/demultiplexing unit 201, shown more in detail in FIG. 7 and described hereafter, is connected to the WDM interface 12 through an optical switching unit 202 routing the optical signals according to their destination.

Figure 7:
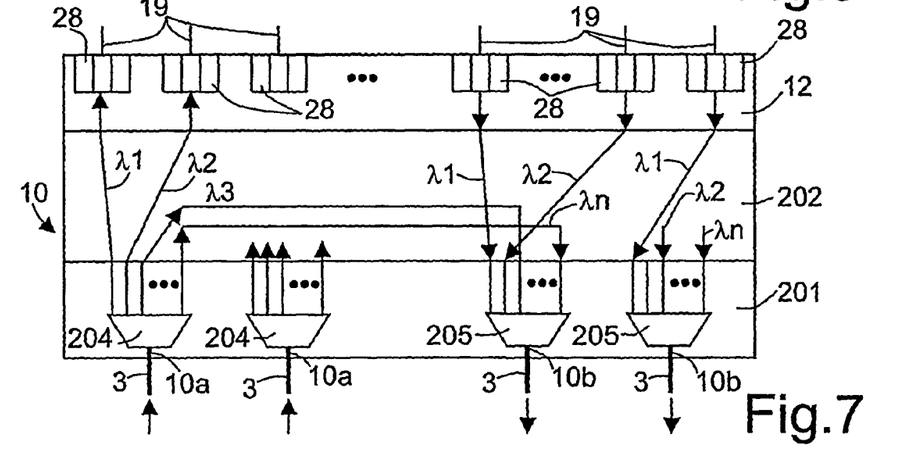
FIG. 7 is a more detailed block diagram of some components of the diagram of FIG. 6.

In detail, as shown in FIG. 7, the multiplexing/demultiplexing unit 201 comprises a set of demultiplexing elements 204 and a set of multiplexing elements 205. Each demultiplexing element 204 has an input connected to an own optical fiber 3 carrying entering signals and a plurality of outputs connected to the optical switching unit 202. Each output of each demultiplexing element 204 thus supplies a single signal at a preset wavelength. Each multiplexing element 205 has a plurality of inputs connected to the optical switching unit 202 and receiving an own signal at a preset wavelength, and an output connected to an own optical fiber 3 and supplying a plurality of exiting signals.

The optical switching unit 202 is connected to all the outputs of the demultiplexing elements 204, all the inputs of the multiplexing elements 205 and all the input/outputs of the transceivers 28 and connects them according to the desired routing of the optical signals. In particular, the optical switching unit 202 may connect a specific output of a demultiplexing element 204 to the receiver of one of the transceivers 28 of the WDM interface 12 or to an input of a multiplexing element 205, according to the destination of the optical signal, analogously to what described for the OADMs 27 with reference to FIG. 5. Furthermore, the optical switching unit 202 may connect an output of the transceivers 28 of the WDM interface 12 to an input of a multiplexing element 205; each multiplexing element 205 then adds the optical signals at its inputs (either coming from an entering optical fiber 3 through a demultiplexing element 204 or from the WDM interface 12) and supplies them together to an own output optical fiber 3.

The actual connections implemented by the optical switching unit 202 between the demultiplexing elements 204, the multiplexing elements 205 and the WDM interface 12 is controlled by the packet and optical control plane 20 according to the settings established following optical path requests and network status, analogously to what described above for a ring-type network.

The electric switching unit 13 then handles the routing of signals entering the node 200 and supplied to the WDM interface 12 toward the packet forwarding module 15 and the non-packet interface 14, and the routing of signals from the packet forwarding module 15 and the non-packet interface 14 toward the WDM interface 12, providing a high switching flexibility according to the connection requirements of the packet and the non-packet signals, as above described.

Finally, it is clear that numerous modifications and variants can be made to the equipment, network and method described and illustrated herein, all falling within the scope of the invention, as defined in the attached claims.

The invention claimed is:

1. A packet and optical routing equipment, comprising:
an optical input suitable for receiving input multiplexed signals;
an optical output suitable for supplying output multiplexed signals;
a non-packet optical port suitable for exchanging branch non-packet signals;
a packet optical port suitable for exchanging branch packet signals;
an optical forwarding and multiplexing stage coupled between said optical input and said optical output;
a packet forwarding stage connected between said optical packet port and said optical forwarding and multiplexing stage;
a non-packet optical/electric converter connected to said non-packet optical port and suitable for converting said branch non-packet signals into and from non-packet electric signals;
a packet optical/electric converter connected between said optical packet port and said packet forwarding stage, said packet optical/electric converter being suitable for converting said branch packet signals into and from electric packet signals exchanged with said packet forwarding stage;

an electric switching unit connected to said non-packet optical /electric converter and said packet forwarding stage for exchanging therewith said electric non-packet and packet signals; and an interface converter coupled between said electric switching unit and said optical forwarding and multiplexing stage for converting said electric non-packet and packet signals into and from optical signals supplied to and from said optical forwarding and multiplexing stage, wherein the packet forwarding stage comprises a packet and optical control plane configured to generate control signals for said optical input and output, said optical forwarding and multiplexing stage, said interface converter, said electric switching unit, and said non-packet and packet optical/electric converters.

2. The equipment according to claim 1, wherein said electric switching unit has a first plurality of input/outputs connected to said non-packet optical/electric converter, a second plurality of input/outputs connected to said packet forwarding stage and a third plurality of input/outputs connected to said interface converter, said electric switching unit being configured to connect a variable number of input/outputs of said first and second plurality to said third plurality of input/outputs.

3. The equipment according to claim 1, wherein said optical input comprises a first and a second input and said optical output comprises a first and a second output; said optical forwarding and multiplexing stage comprising a first set of cascade connected optical add/drop multiplexers and a second set of cascade connected optical add/drop multiplexers.

4. The equipment according to claim 3, wherein said first set of optical add/drop multiplexers is coupled between said first input and said first output and said second set of optical add/drop multiplexers is coupled between said second input and said second output.

5. The equipment according to claim 3, wherein said optical add/drop multiplexers are of a tunable type.

6. The equipment according to claim 3, wherein said interface converter comprises a plurality of transceivers, each transceiver being connected to a respective one of said optical add/drop multiplexers.

7. The equipment according to claim 6, wherein each said transceiver comprises a transmitter laser of tunable type, a gray receiver and an electronic unit.

8. The equipment according to claim 1, wherein said packet forwarding stage comprises:
   a packet forwarding module, coupled between said electric switching unit and said packet optical /electric converter.

9. The equipment according to claim 8, wherein said optical input and output comprise channel termination units suitable for extracting and/or adding control signals having a different wavelength with respect to said input and output multiplexed signals.

10. The equipment according to claim 9, wherein said channel termination units are connected with said packet forwarding module for exchanging said control signals therewith.

11. The equipment according to claim 8, wherein said packet and optical control plane are suitable for generating control signals for said optical forwarding and multiplexing stage and wherein said optical forwarding and multiplexing stage is configured to route first selected of said input multiplexed signals toward said optical output to extract second selected of said input multiplexed signals toward said interface converter and to add said optical signals to said output multiplexed signals.

12. The equipment according to claim 1, wherein said optical input comprises a plurality of inputs and said optical output comprises a plurality of outputs and wherein said optical forwarding and multiplexing stage comprises an optical switching unit connected to said interface converter and a multiplexing/demultiplexing unit connected between said optical switching unit and said inputs and outputs.

13. An optical network of wavelength multiplexing type, comprising a plurality of packet and optical routing equipment and a plurality of optical connections extending between pairs of packet and optical routing equipment, each said packet and optical routing equipment comprising:

an optical input connected to a first of said optical connections and receiving input multiplexed signals;

an optical output connected to a second of said optical connections and supplying output multiplexed signals;

a non-packet optical port exchanging branch non-packet signals;

a packet optical port exchanging branch packet signals;

optical forwarding and multiplexing stage coupled between said optical input and said optical output;

a packet forwarding stage connected between said optical packet port and said optical forwarding and multiplexing stage;

each said packet and optical routing equipment comprising:

a non-packet optical /electric converter connected to said non-packet optical port and converting said branch non-packet signals into and from non-packet electrical signals;

a packet optical/electric converter connected between said optical packet port and said packet forwarding stage, said packet optical/electric converter converting said branch packet signals into and from electric packet signals exchanged with said packet forwarding stage;

an electric switching unit connected to said non-packet optical/electric converter and said packet forwarding stage for exchanging therewith said electric non-packet and packet signals; and an interface converter coupled between said electric switching unit and said optical forwarding and multiplexing stage for converting said electric non-packet and packet signals into and from optical signals supplied to and from said optical forwarding and multiplexing stage, wherein the packet forwarding stage comprises a packet and optical control plane configured to generate control signals for said optical input and output, said optical forwarding and multiplexing stage, said interface converter, said electric switching unit, and said non-packet and packet optical/electric converters.

14. A method for packet and optical signal routing, comprising:

receiving, at an optical forwarding and multiplexing stage, input multiplexed optical signals;

receiving, at a non-packet optical/electric converter, branch non-packet optical signals;

receiving, at a packet optical/electric converter, branch packet optical signals;

forwarding, by the optical forwarding and multiplexing stage, first selected of said input multiplexed optical signals as output multiplexed optical signals;

extracting second selected of said input multiplexed optical signals and adding said branch non-packet and packet optical signals to said output multiplexed optical signals;

said adding said branch non-packet and packet optical signals to said output multiplexed optical signals comprising:
  converting said received branch non-packet and packet optical signals into non-packet and packet electric signals;
  switching, by an electric switching unit, said non-packet and packet electric signals according to available resources;
  converting, by an interface converter, the switched non-packet and packet electric signals into optical signals; and
  adding, by the optical forwarding and multiplexing stage, said optical signal to said output multiplexed signals;

wherein the extracting second selected of said input multiplexed optical signals and adding said branch non-packet and packet optical signals to said output multiplexed optical signals are executed in a single packet and optical routing node;

generating, at a packet and optical control plane, control signals for an optical input and output, the optical forwarding and multiplexing stage, the interface converter, the electric switching unit, and the non-packet and packet optical/electric converters.

15. The method according to claim 14, further comprising:
converting said second selected of said input multiplexed signals into extracted electric signals;
switching said extracted electric signals to obtain first and second electric signals;
converting said first electric signals into branch non-packet optical signals;
sending said branch non-packet optical signals to a non-packet destination;
converting said second electric signals into branch packet optical signals; and
routing said branch packet optical signals toward a packet destination.

16. The method according to claim 14, comprising:
generating control signals in a first packet and optical routing equipment;
transmitting said control signals onto a first optical connection line;
receiving said control signals at a second packet and optical routing equipment;
checking the destination of said control signals at a second packet and optical routing equipment and, if said second packet and optical routing equipment is not a destination equipment,
routing said control signals onto a second optical connection line toward a further packet and optical routing equipment, and
repeating the previous step at the further packet and optical routing equipment until a destination packet and optical routing equipment for the control signals is reached, so as to establish a path for said control signals including the packet and optical routing pieces of equipment between said first and said destination packet and optical routing equipment;
checking a traffic condition to detect a low or high traffic condition for said branch packet signals; and
in case of low traffic condition, implementing a base connectivity for said branch packet optical signals including the packet and optical routing pieces of equipment between said first and said destination packet and optical routing equipment; and
in case of high traffic condition, implementing a direct connectivity for said branch packet optical signals between said first and said destination packet and optical routing equipment.

17. The method according to claim 16, wherein said implementing a base connectivity comprises transmitting said branch packet optical signals together with said control signals from said first to said destination packet and optical routing equipment.

18. A method for packet and optical signal routing, comprising:
receiving input multiplexed optical signals;
receiving branch non-packet optical signals;
receiving branch packet optical signals;
forwarding first selected of said input multiplexed optical signals as output multiplexed optical signals;
extracting second selected of said input multiplexed optical signals and adding said branch non-packet and packet optical signals to said output multiplexed optical signals;
said adding said branch non-packet and packet optical signals to said output multiplexed optical signals comprising:
  converting said received branch non-packet and packet optical signals into non-packet and packet electric signals;
  switching said non-packet and packet electric signals according to available resources;
  converting the switched non-packet and packet electric signals into optical signals; and
  adding said optical signal to said output multiplexed signals;
generating control signals in a first packet and optical routing equipment;
transmitting said control signals onto a first optical connection line;
receiving said control signals at a second packet and optical routing equipment;
checking the destination of said control signals at a second packet and optical routing equipment and, if said second packet and optical routing equipment is not a destination equipment,
routing said control signals onto a second optical connection line toward a further packet and optical routing equipment, and
repeating the previous step at the further packet and optical routing equipment until a destination packet and optical routing equipment for the control signals is reached, so as to establish a path for said control signals including the packet and optical routing pieces of equipment between said first and said destination packet and optical routing equipment;
checking a traffic condition to detect a low or high traffic condition for said branch packet signals; and
in case of low traffic condition, implementing a base connectivity for said branch packet optical signals including the packet and optical routing pieces of equipment between said first and said destination packet and optical routing equipment; and in case of high traffic condition, implementing a direct connectivity for said branch packet optical signals between said first and said destination packet and optical routing equipment.

19. The method according to claim 18, wherein said implementing a base connectivity comprises transmitting said branch packet optical signals together with said control signals from said first to said destination packet and optical routing equipment.

* * * * *